United States Patent [19]

Brown et al.

[11] Patent Number: 5,068,763
[45] Date of Patent: Nov. 26, 1991

[54] ELECTRIC BUSWAY-METER MODULE ARRANGEMENT

[75] Inventors: Stephen E. Brown, Selmer; Donnie F. Meeks, Savannah; Ralph W. Souders, Ramer; Richard A. Thompson, Selmer, all of Tenn.

[73] Assignee: General Electric Company, New York, N.Y.

[21] Appl. No.: 605,728

[22] Filed: Oct. 29, 1990

[51] Int. Cl.⁵ ............................................. H02G 5/06
[52] U.S. Cl. .................................. 361/364; 174/68.2; 174/88 B
[58] Field of Search .............. 174/16.2, 68.2, 70 B, 174/88 B; 361/355, 361, 365, 374, 378; 439/210, 212, 213

[56] References Cited

U.S. PATENT DOCUMENTS

| | | | |
|---|---|---|---|
| 3,187,086 | 6/1965 | Moodie et al. | 174/68.2 |
| 3,346,687 | 10/1967 | Giger, Jr. et al. | 174/68.2 |
| 4,041,358 | 8/1977 | Donahue et al. | 361/365 |
| 4,112,249 | 9/1978 | Carlson | 174/68.2 |
| 4,804,804 | 2/1989 | Hibbert et al. | 174/16.2 |
| 4,849,581 | 7/1989 | Larkin et al. | 174/68.2 |
| 4,929,801 | 5/1990 | Hibbert | 174/16.2 |

Primary Examiner—Gregory D. Thompson
Attorney, Agent, or Firm—Richard A. Menelly; Fred Jacob

[57] ABSTRACT

Electric meters contained within modular enclosures are field-installed within the electric distribution system busway by a busway riser and an associated busway connector. The busway connector interfaces between a pair of meter modules electrically connected on either side by means of busway connector straps. The busway connector straps are welded to the individual bus bars within the busway system on both sides of the bus bars.

9 Claims, 3 Drawing Sheets

ELECTRIC BUSWAY-METER MODULE ARRANGEMENT

BACKGROUND OF THE INVENTION

The invention relates to field-installable meter modules of the type containing a plurality of externally visible electric power consumption meters such as described for example in U.S. Pat. No. 4,041,358 entitled "Meter Module Assembly for a Meter Panel". The meter modules electrically connect with the electric power distribution system by means of an electric busway system riser. The busway system riser includes separate vertically extending bus conductors, one for each phase within the multi-phase power distribution system along with a neutral bus conductor. The individual electric bus bar conductors are "bumped" to provide a space for bolting to a Z-bar conductor which in turn bolts onto the meter module for providing electrical connection with the meters contained therein. The bumping of the busway conductors to provide for attachment of the Z-bar conductors substantially increases the overall width of the busway system riser and the meter module panels. When such meter modules are used within high-rise apartments, such additional space requirement is troublesome and limits the location where such meter modules and busway system riser can be installed. The advent of a closely-spaced thermally efficient power busway-meter module such as described in U.S. Pat. Nos. 4,804,804 and 4,929,801 substantially reduces the overall size and weight of busway systems. It would be economically advantageous to use such efficient busway systems in combination with standard meter module assemblies in order to realize a corresponding savings in space and cost.

One purpose of the invention is to provide a means for connecting between a thermally-efficient power busway system and a plurality of meter module assemblies to result in a corresponding savings in both space and cost.

SUMMARY OF THE INVENTION

Meter modules of the type consisting of a plurality of electric power meters arranged within a common enclosure are connected with the electrical distribution power system by means of a power busway-meter module connector. The connector consists of closely spaced bus conductors bolted together and insulated from each other for good mechanical strength along with efficient thermal transfer. Connections are made to opposing sides of the bus conductors by welding angulated straps to the opposing sides and applying epoxy insulation over the welds and over part of the remaining portion of the angulated straps for electrical insulation purposes.

DESCRIPTION OF THE PREFERRED EMBODIMENT

Figure 1:
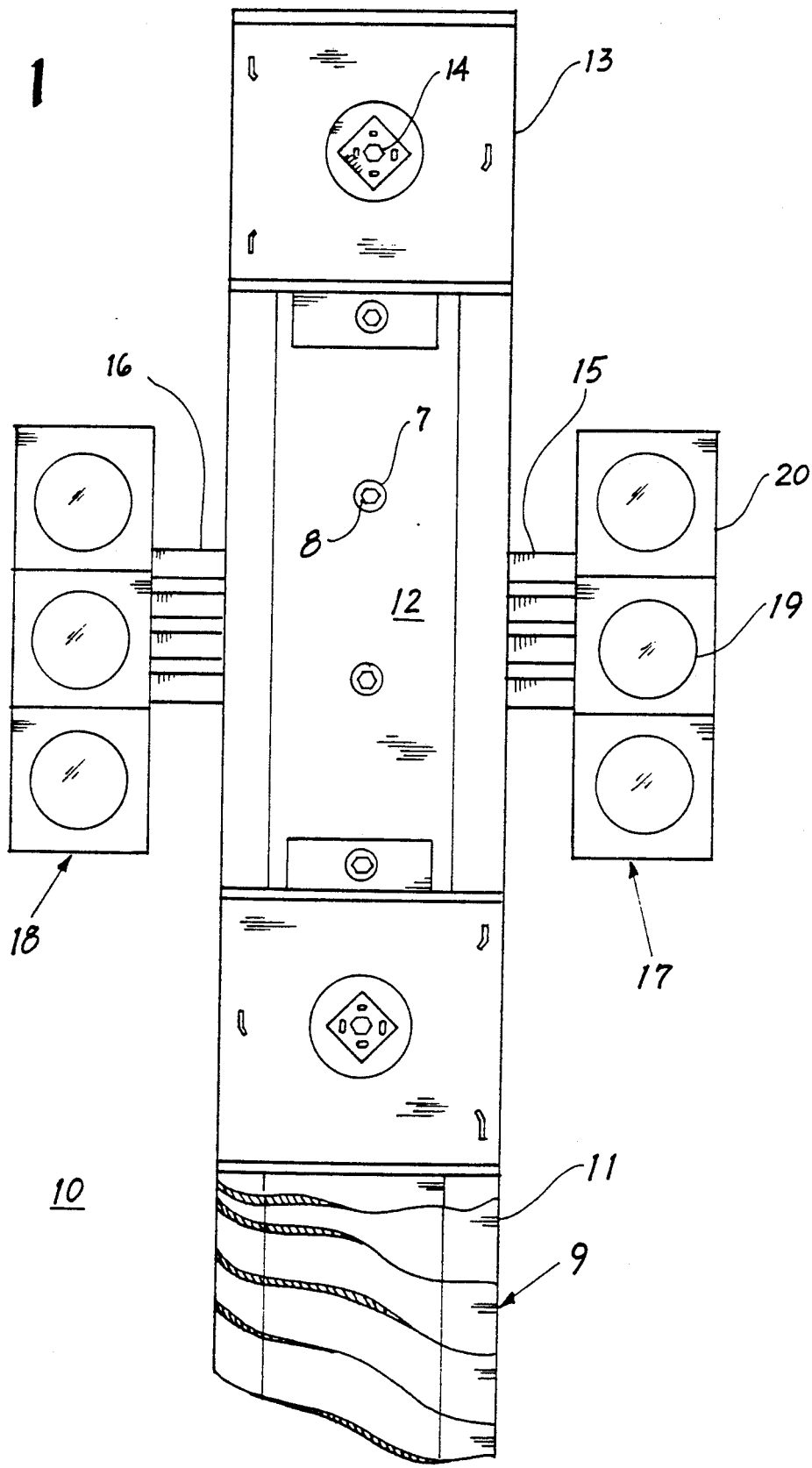
FIG. 1 is a front plan view of a pair of meter-modules electrically connected with the power busway-meter module connector in accordance with the invention.

A meter module assembly 10 shown in FIG. 1 includes four electrically insulated bus bar conductors within the power system busway 9 which terminates in the form of a busway riser 11. The bus bar conductors each carry a separate current phase of a three-phase electrical power distribution system and are connected together by means of Belville washers 7 and hexagonal bolts 8 as described in the aforementioned U.S. Pat. No. 4,804,804. The power busway-meter module connector 12 is arranged between a pair of busway joints 13 which are separately connected together by means of bolts 14. One example of a busway joint is found in U.S. Pat. No. 4,849,581 entitled "Adjustable Joint for Electrical Busway" which Patent is incorporated herein for reference purposes. A right side meter module 17 is arranged on the right of the power busway-meter module connector and a corresponding left side meter module 18 is connected to the left of the power busway-meter module connector as viewed in FIG. 1. Each of the meter modules includes a meter enclosure 20 that supports a plurality of electric power meters 19. The right side meter module is connected with the power busway-meter module connector by means of the male connector straps 15 and the left side meter module 18 is connected by means of the female connector straps 16 in a manner which will be discussed below in greater detail.

Figure 2:
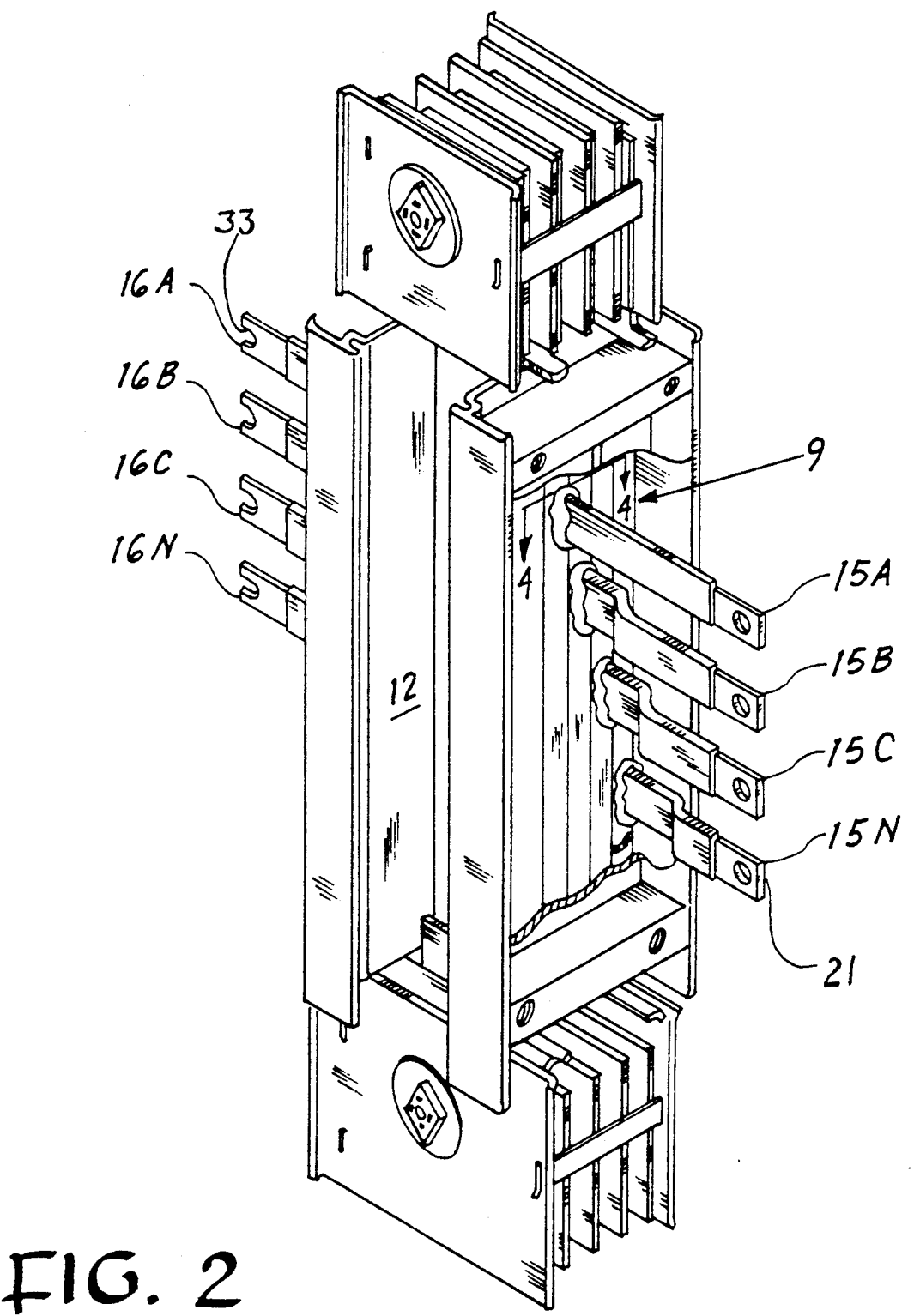
FIG. 2 is a front perspective view of the power busway-meter module connector of FIG. 1 depicting the meter module connector straps.

The arrangement of the male connector straps 15A–15N and female connector straps 16A–16N is best seen by referring now to the power busway-meter module connector 12 depicted in FIG. 2 wherein they are electrically connected with the three-phase bus conductors and the neutral bus conductor within the power system busway 9. The female phase connector straps 16A–16C on the left side of the power busway-meter module connector connect with the same bus bars to which the male connector straps on the right side are attached. The female neutral connector strap 16N on the left side of the power busway-meter module connects with the same neutral bus bar conductor to which the male neutral connector strap 15N on the right side is attached. The slotted holes 33 on the female straps facilitate connection with the right side of the power busway-meter module connectors while the thru-holes 21 on the male straps facilitate connection with the left side thereof.

Figure 3:
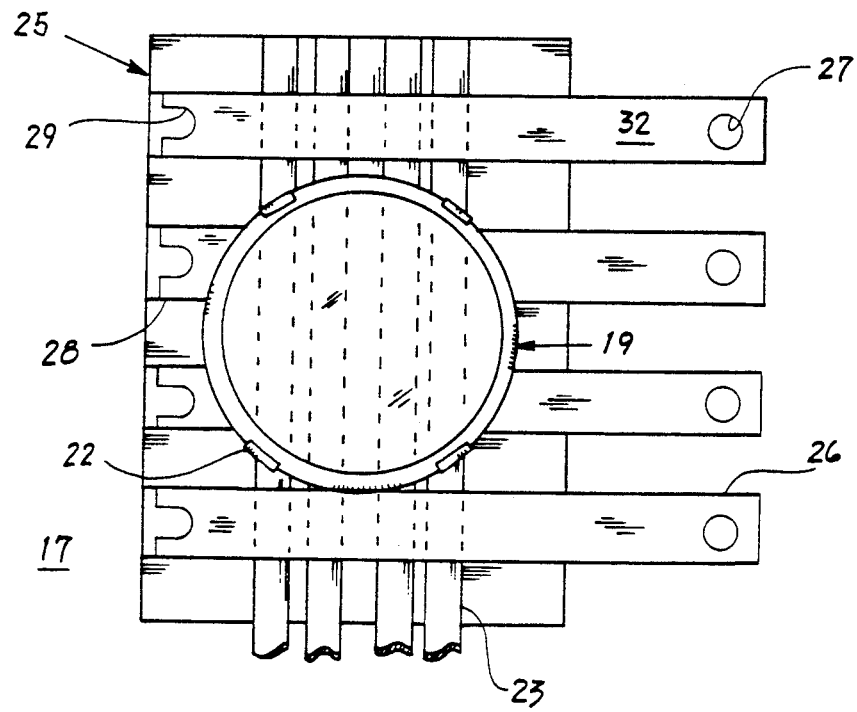
FIG. 3 is a front plan view of the meter module of FIG. 1 with the cover removed to depict the busway conductor straps.

FIG. 3 depicts the right side meter module 17 with the cover removed to detail the male connectors 26 arranged on one side of the double-ended strap 32 and the corresponding female connectors 28 arranged on the opposite side thereof within the meter module base 25. The double-ended straps are mechanically and electrically attached to the vertical bus conductors 23 which carry the various phases of the three-phase power distribution system described earlier. The male connectors include thru-holes 27 at the ends thereof whereas the female connectors include slots 29 formed at the opposite ends thereof. The electric power meters 19 are attached to the meter module base 25 by means of four meter retainer clips one of which is indicated at 22. When the meter module is attached to the right side of the power busway-meter module connector 12 of FIG. 2, the slots 29 on one side of the meter module 17 are sandwiched between the ends of the male connector straps 15A-15N and are bolted together. When the meter module is attached to the left side of the power busway-meter module of FIG. 2, the thru-holes 27 on the opposite side of the meter module are arranged next to the slots 33 formed on the ends of the female connector straps 16A-16N and are bolted together to form the complete meter module assembly depicted at 10 in FIG. 1.

Figure 4:
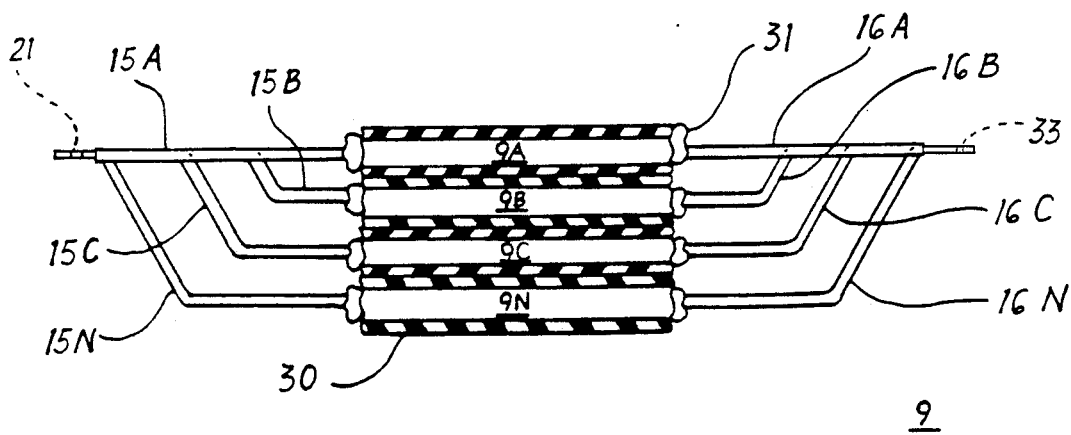
FIG. 4 is an enlarged cross-sectional end view of the power busway-meter module connector of FIG. 2 as viewed through the 4—4 plane.

The connection between the male and female connector straps 15A-15N, 16A-16N and the bus bar conductors 9A-9N is best seen by referring now to FIG. 4 wherein the insulated bus bars 9A-9N are depicted in an enlarged cross-sectional end view to detail the welds 31 formed between the edges of the straps 15A-15N, 16A-16N and the corresponding bus bar conductors 9A-9N. The epoxy coating 30 is subsequently applied over the weld as well as over the remainder of the connector straps except for the ends where the thru-holes 21 and slots 33 are arranged for electrical and mechanical connection with the meter modules.

A compact and efficient power busway-meter module connector for attaching meter modules to the electric power distribution system has herein been described. The connector is derived from thermally efficient busway to which angulated connector straps are attached by welding to the opposite sides thereof.

Having thus described our invention, what we claim as new and desire to secure by Letters Patent is:

1. A power busway-meter module connector comprising:
   a plurality of rectangular electrical bus conductors electrically-insulated from each other and bolted together;
   a corresponding plurality of electrically-conductive straps, each of said straps being welded at one of their ends to opposing edges of said bus conductors and each of said straps terminating at opposite ends, said opposite ends being adapted for connection with said straps and said electrical bus conductors; and
   electrical insulation arranged over aid one ends and said straps except for said opposite ends.

2. The power busway-meter module connector of claim 1 wherein said opposite ends include slots.

3. The power busway-meter module connector of claim 1 wherein said opposite ends include thru-holes.

4. The power busway-meter module connector of claim 1 wherein said insulation comprises an epoxy coating.

5. The power busway-meter module connector of claim 1 wherein said straps comprise an angulated configuration.

6. A meter module system comprising in combination:
   a meter module including an enclosure having an electrical power meter arranged within a front part thereof;
   a plurality of first electrical connectors on one side of said module arranged for electrical connection with an electric power distribution system;
   a corresponding plurality of second electrical connectors on an opposite side of said module arranged for electrical connection with said electrical distribution system;
   an electrical power distribution circuit connector comprising a plurality of bus conductors insulated from each other and bolted together, said circuit connector including a plurality of connector straps each of said connector straps being welded to one edge of each of said bus conductors on one side thereof; and
   first electric connection means formed on said connector straps on an end of said straps opposite said one edge, said first electrical connection means being attached to said first electrical connectors on said one side.

7. The meter module system of claim 6 including second electric connection means formed on said connector straps on an end of said straps opposite said one edge, said second electrical connection means being attached to second electrical connectors an opposite side of said bus conductors.

8. The meter module of claim 6 including a coating of insulation on said connector straps and said bus conductors.

9. The meter module of claim 6 wherein said connector straps are angulated to thereby provide arrangement of said first and second connection means in a common plane with said first and second electrical connectors.

* * * * *